(12) United States Patent
Miyata et al.

(10) Patent No.: US 8,185,225 B2
(45) Date of Patent: May 22, 2012

(54) PROGRAM CREATION APPARATUS, NUMERICAL CONTROL APPARATUS, PROGRAM CREATION METHOD

(75) Inventors: Akira Miyata, Chiyoda-ku (JP); Kenji Iriguchi, Chiyoda-ku (JP); Takashi Iwasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 243 days.

(21) Appl. No.: 12/663,146

(22) PCT Filed: Jun. 6, 2007

(86) PCT No.: PCT/JP2007/061424
§ 371 (c)(1),
(2), (4) Date: Dec. 4, 2009

(87) PCT Pub. No.: WO2008/149431
PCT Pub. Date: Dec. 11, 2008

(65) Prior Publication Data
US 2010/0185310 A1 Jul. 22, 2010

(51) Int. Cl.
*G06F 19/00* (2011.01)
(52) U.S. Cl. .......................... 700/97; 700/159
(58) Field of Classification Search .................... 700/97, 700/159, 168, 186, 117, 190, 182; 29/896.91
See application file for complete search history.

(56) References Cited

U.S. PATENT DOCUMENTS 5,249,135 A 9/1993 Fujita
5,611,032 A * 3/1997 Matsuura et al. ............. 700/182
2002/0015036 A1 2/2002 Shiroyama et al.
2005/0222706 A1 * 10/2005 Muraki et al. ................. 700/187
2007/0144316 A1 * 6/2007 Muraki et al. ................. 82/1.11

FOREIGN PATENT DOCUMENTS

EP 0 550 268 B1 5/1996
(Continued)

OTHER PUBLICATIONS

Ji P et al: "A Digraphic Approach for Dimensional Chain Identification in Design and Manufacturing", Transactions of the American Society of Mechanical Engineers, Series B: Journal of Engineering for Industry, ASME, New York, US, vol. 118, No. 4, Nov. 1, 1996, pp. 539-544, X000635783, ISSN: 0022-0817.

(Continued)

*Primary Examiner* — Kidest Bahta
(74) *Attorney, Agent, or Firm* — Sughrue Mion, PLLC

(57) ABSTRACT

An NC programming assisting apparatus that creates an NC machining program reflecting dimensional tolerance data on shape data of a machining subject includes a machining target dimension calculation unit that calculates machining target dimensions of the machining subject based on the shape data and the dimensional tolerance data; a shape data deform processing unit that sets post-movement positions of graphic elements based on positional movement information about how to move the graphic elements, the machining target dimension, and the shape data so that a dimension between graphic elements included in the shape data conforms to the corresponding machining target dimension; and an NC machining program generation processing unit that creates an NC machining program by using the shape data and the post-movement position of each graphic element.

14 Claims, 14 Drawing Sheets

FOREIGN PATENT DOCUMENTS

| | | |
|---|---|---|
| JP | 60-201860 A | 10/1985 |
| JP | 61-015204 A | 1/1986 |
| JP | 62-166407 A | 7/1987 |
| JP | 62-246460 A | 10/1987 |
| JP | 03-189803 A | 8/1991 |
| JP | 04-245305 A | 9/1992 |
| JP | 04-352006 A | 12/1992 |
| JP | 06-223081 A | 8/1994 |
| JP | 07-105271 A | 4/1995 |
| JP | 2003-117773 A | 4/2003 |
| JP | 2004-227327 A | 8/2004 |
| JP | 2004-246493 A | 9/2004 |
| RU | 43204 U1 | 1/2005 |
| SU | 876328 A | 10/1981 |
| SU | 999020 A | 2/1983 |
| SU | 1035567 A | 8/1983 |

OTHER PUBLICATIONS

Russian decision of patent grant, with translation dated Jul. 22, 2011.

* cited by examiner

FIG.2

| NO. | GRAPHIC ELEMENT 1 | GRAPHIC ELEMENT 2 | DIMENSION TYPE | NOMINAL DIMENSION | UPPER DIMENSIONAL DEVIATION | LOWER DIMENSIONAL DEVIATION | ADJUSTMENT MODE |
|---|---|---|---|---|---|---|---|
| D1 | 001 | 002 | DISTANCE | 45.0 | +0.050 | +0.025 | FIX ELEMENT 1 |
| D2 | 002 | 004 | DISTANCE | 20.0 | +0.050 | −0.020 | AUTOMATIC |
| D3 | 006 | (INVALID) | DIAMETER | φ15.0 | +0.025 | 0.000 | (INVALID) |
| : | ..... | ..... | ..... | ..... | ..... | ..... | ..... |

51

FIG.3
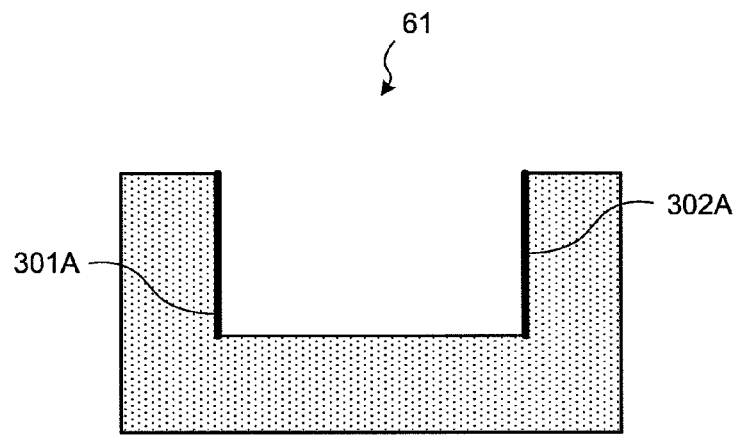
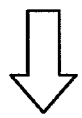
| NO. | GRAPHIC ELEMENT 1 | GRAPHIC ELEMENT 2 | .... | ADJUSTMENT MODE |
|-----|-------------------|-------------------|------|-----------------|
| D11 | EDGE 301A | EDGE 302A | .... | FIX ELEMENT 1 |
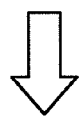
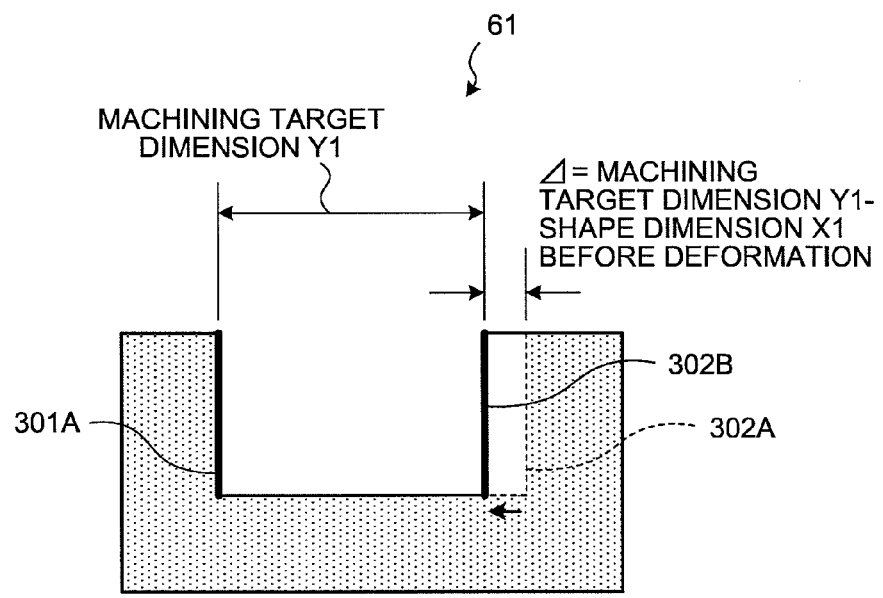

FIG.4
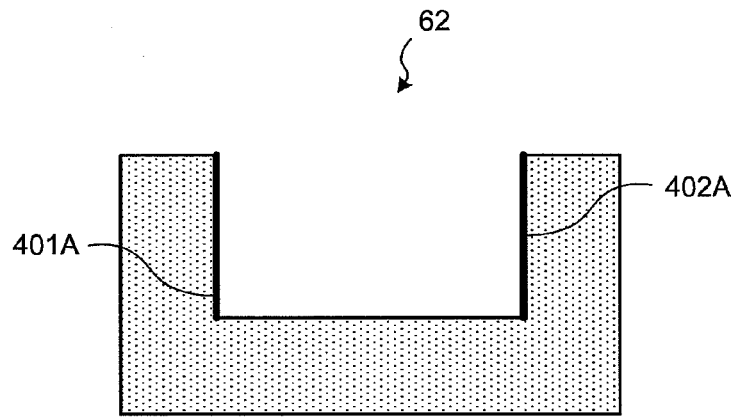
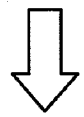
| NO. | GRAPHIC ELEMENT 1 | GRAPHIC ELEMENT 2 | .... | ADJUSTMENT MODE |
|-----|-------------------|-------------------|------|-----------------|
| D12 | EDGE 401A | EDGE 402A | .... | FIX CENTER |
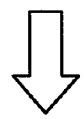
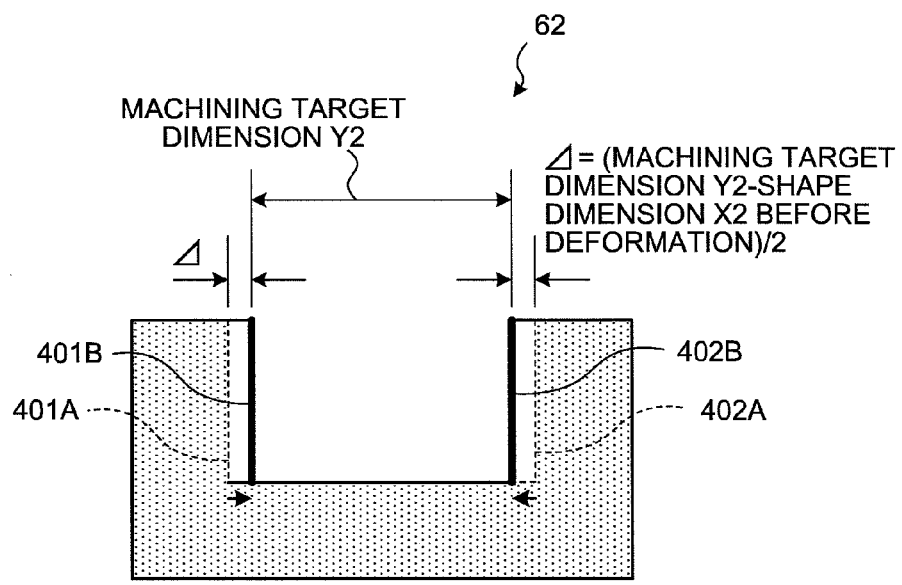

FIG.5
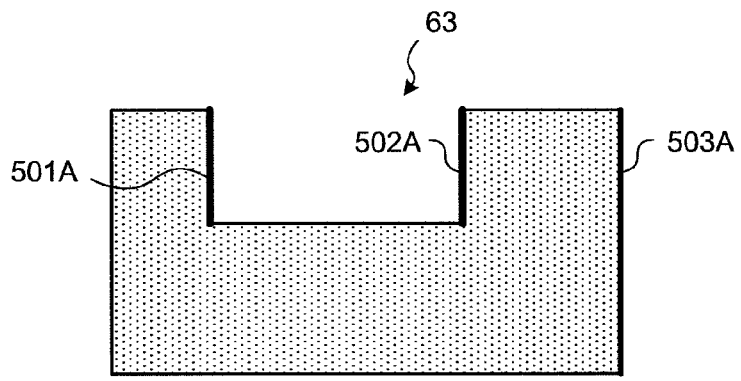
| NO. | GRAPHIC ELEMENT 1 | GRAPHIC ELEMENT 2 | .... | ADJUSTMENT MODE |
|-----|-------------------|-------------------|------|-----------------|
| D13 | EDGE 502A | EDGE 503A | .... | FIX ELEMENT 2 |
| D14 | EDGE 501A | EDGE 502A | .... | AUTOMATIC |
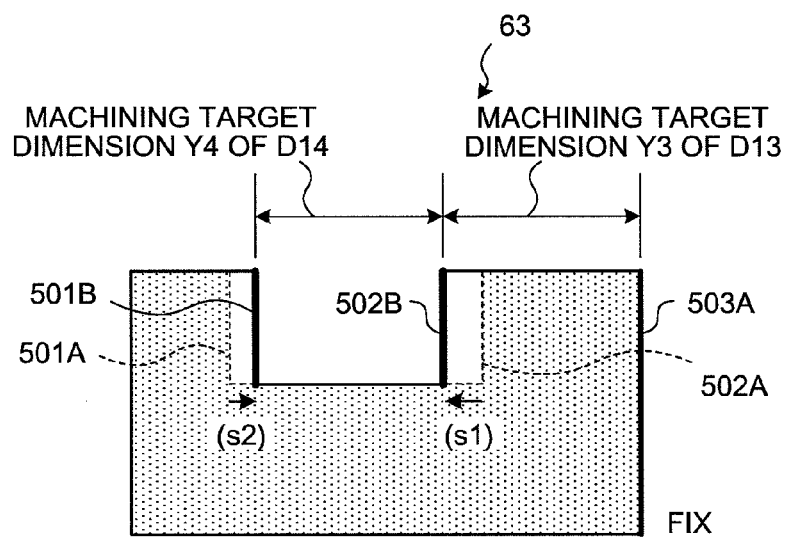

FIG.7

| NO. | GRAPHIC ELEMENT 1 | GRAPHIC ELEMENT 2 | DIMENSION TYPE | NOMINAL DIMENSION | UPPER DIMENSIONAL DEVIATION | LOWER DIMENSIONAL DEVIATION | ADJUSTMENT MODE | GROUP |
|---|---|---|---|---|---|---|---|---|
| D21 | RIDGE LINE 601A | RIDGE LINE 603A | DISTANCE | 80.0 | +0.05 | +0.01 | FIX ELEMENT 1 | G1 |
| D22 | RIDGE LINE 602A | RIDGE LINE 603A | DISTANCE | 40.0 | +0.03 | −0.01 | AUTOMATIC | G1 |
| D23 | RIDGE LINE 604A | RIDGE LINE 605A | DISTANCE | 35.0 | +0.03 | +0.01 | FIX CENTER | G2 |
| D24 | RIDGE LINE 607A | RIDGE LINE 608A | DISTANCE | 25.0 | +0.03 | +0.01 | FIX ELEMENT 2 | G3 |

FIG.11

| ID | X-COORDINATE | Y-COORDINATE | LIST OF GRAPHIC ELEMENT |
|---|---|---|---|
| 1001 | 10.0 | 20.0 | 61, 62, 63···· |
| 1002 | 30.0 | 55.0 | 71, 72, 73···· |
| ···· | ···· | ···· | ···· |

PROGRAM CREATION APPARATUS, NUMERICAL CONTROL APPARATUS, PROGRAM CREATION METHOD

TECHNICAL FIELD

The present invention relates to a program creation apparatus, a numerical control apparatus, and a program creation method that creates a numerical control (NC) machining program for numerically controlling a machine tool.

BACKGROUND ART

In a numerical control machine tool that conducts machining accurately and precisely as instructed by an NC machining program, it is important, in terms of quality control and productivity, how to create the machining program easily and efficiently that yields a machining result as intended by a designer who designs an object to be machined.

Along with the recent enhancement of an NC program creation assisting function of a program creation apparatus, it has become possible for an operator to create an NC machining program easily by setting coordinates of machining subjects while referring to a production drawing. An apparatus has appeared that can create an NC machining program by directly importing computer aided design (CAD) data modeled by a designer using a CAD system.

For machining a region of such as fit (mating) and a dimensional tolerance which is related to the function or performance of an object to be machined as a product, it is necessary to have an NC machining program reflect a machining target dimension considering the fit or the dimensional tolerance. Especially, a machining target dimension may be a value different from a nominal dimension in the case of a fit or a dimensional tolerance in which permissible upper and lower dimensional deviations (dimensional upper limit and dimensional lower limit) are asymmetric being one-sided to either one (dimensional upper limit or dimensional lower limit).

When an NC machining program is directly programmed (modified) while referring to a production drawing, an operator calculates a machining target dimension manually or by using a calculator, and a coordinate compensated based on the calculation result is input to the NC machining program. In this method, miscalculation or input error is likely to occur and the created NC machining program becomes unreliable because modification of the NC machining program is complicated.

To solve this problem, a method has been proposed that enables to directly write nominal dimensions and tolerance information (dimensional tolerances or the like) in the NC machining program and making a numerical control apparatus perform machining process based on the written information.

For example, a numerical control apparatus described in Patent Document 1 stores therein dimensional deviation data based on the nominal dimension and tolerance zone class of a fit. The apparatus calculates the central position of a tolerance zone based on a command in the machining program that describes the nominal dimension and tolerance zone class of a fit of a machining object as well as the stored dimensional deviation data corresponding to the command, and then performs axis control using the calculated central position as a move command of the controlled axis. Therefore, a programmer can directly program the nominal dimension and tolerance zone class of a region of a fit written on a machining drawing.

An automatic fit compensator of a numerical control apparatus described in Patent Document 2 detects a fit symbol sandwiched by predetermined bound symbols from an NC command program, and calculates a cut dimension based on the dimension corresponding to the fit symbol and the dimension in the NC command program.

In a machining control method described in Patent Document 3, when a dimensional deviation is indicated with a specific numeric value in a dimensional deviation description area in a machining program, a machining target dimension is determined based on the numeric value as indicated, and when a dimensional deviation is indicated with a fit code, a dimensional deviation table is searched, then a machining target dimension is determined.

Patent Document 1: Japanese Patent Application Laid-open No. 4-245305
Patent Document 2: Japanese Patent Application Laid-open No. 61-15204
Patent Document 3: Japanese Patent Application Laid-open No. 60-201860

DISCLOSURE OF INVENTION

Problem to be Solved by the Invention

In the first to the third conventional techniques, a central position can be calculated only when there is a single machining subject surface involved in a dimension to be calculated, and when a piece of tolerance information and a machining command unit correspond to each other one-to-one so that the position to write the nominal dimension and tolerance information can be localized. Accordingly, there has been a problem that a nominal dimension and tolerance information cannot be directly written in an NC machining program unless tolerance information is specified for a diameter of a cylindrical surface as in a case of a fit of an axis or a hole, for example, or unless tolerance information is specified for a relative dimension from an absolute reference position (the program origin or the like). In other words, there has been a problem that a nominal dimension and tolerance information cannot be written directly in an NC machining program if a plurality of machining subject surfaces are involved as in a case of a distance between surfaces. Furthermore, there has been a problem that an operator's process becomes complicated when the operator analyzes a drawing carefully to allocate tolerances appropriately.

On a program creation apparatus that has a capability of importing CAD data and creating an NC machining program from it, the shape of a machining subject can be modeled using machining target dimensions with tolerances included in advance. This method cannot be an essential solution because a designer or a CAD data creator is forced to calculate machining target dimensions and to input them to the NC machining program. Because nominal dimensions are lost, which are significant in terms of design, this method may result in preparing an NC machining program that yields a machining result not intended by a designer.

The present invention has been made in view of the circumstance described above, and an object thereof is to obtain a program creation apparatus, a numerical control apparatus, and a program creation method that can easily prepare an NC machining program reflecting design intent represented in a dimensional tolerance even when a plurality of machining subject surfaces are involved.

Means for Solving Problem

In order to solve the above mentioned problems and achieve the object, in a program creation apparatus that creates an NC machining program reflecting dimensional tolerance data on shape data, based on the shape data of a machining subject and the dimensional tolerance data of the shape data, the present invention includes a machining target dimension calculation unit that calculates machining target dimensions of the machining subject based on the shape data and the dimensional tolerance data; a shape data deform processing unit that sets post-movement positions of graphic elements included in the shape data based on the machining target dimensions calculated by the machining target dimension calculation unit and the shape data so that a dimension between the graphic elements conforms to the corresponding machining target dimension; and a machining program creation unit that creates an NC machining program by using the shape data and the post-movement position of each graphic element set by the shape data deform processing unit, wherein the dimensional tolerance data includes positional movement information about how to move the graphic elements, and the shape data deform processing unit sets the post-movement positions of the graphic elements based on the positional movement information.

Effect of the Invention

The program creation apparatus according to the present invention provides an effect that an NC machining program reflecting a dimensional tolerance can be easily prepared by setting post-movement positions of graphic elements so that the dimension between the graphic elements included in shape data becomes a machining target dimension, based on positional movement information about how to move the graphic elements, even when a plurality of machining subject surfaces are involved.

BRIEF DESCRIPTION OF DRAWINGS

FIG. 2 is a view illustrating an exemplary configuration of a dimensional tolerance data table.

FIG. 3 is a view for explaining a method of moving/deforming shape data when an adjustment mode is "Fix element 1".

FIG. 4 is a view for explaining a method of moving/deforming shape data when an adjustment mode is "Fix center".

FIG. 5 is a view for explaining a method of moving/deforming shape data when an adjustment mode is "Automatic".

FIG. 7 is a view illustrating a configuration of a dimensional tolerance data table including an asymmetric dimensional tolerance among dimensions shown in FIG. 6.

FIG. 11 is a view illustrating an exemplary configuration of a point graphic data table.

EXPLANATIONS OF LETTERS OR NUMERALS

Figure 1:
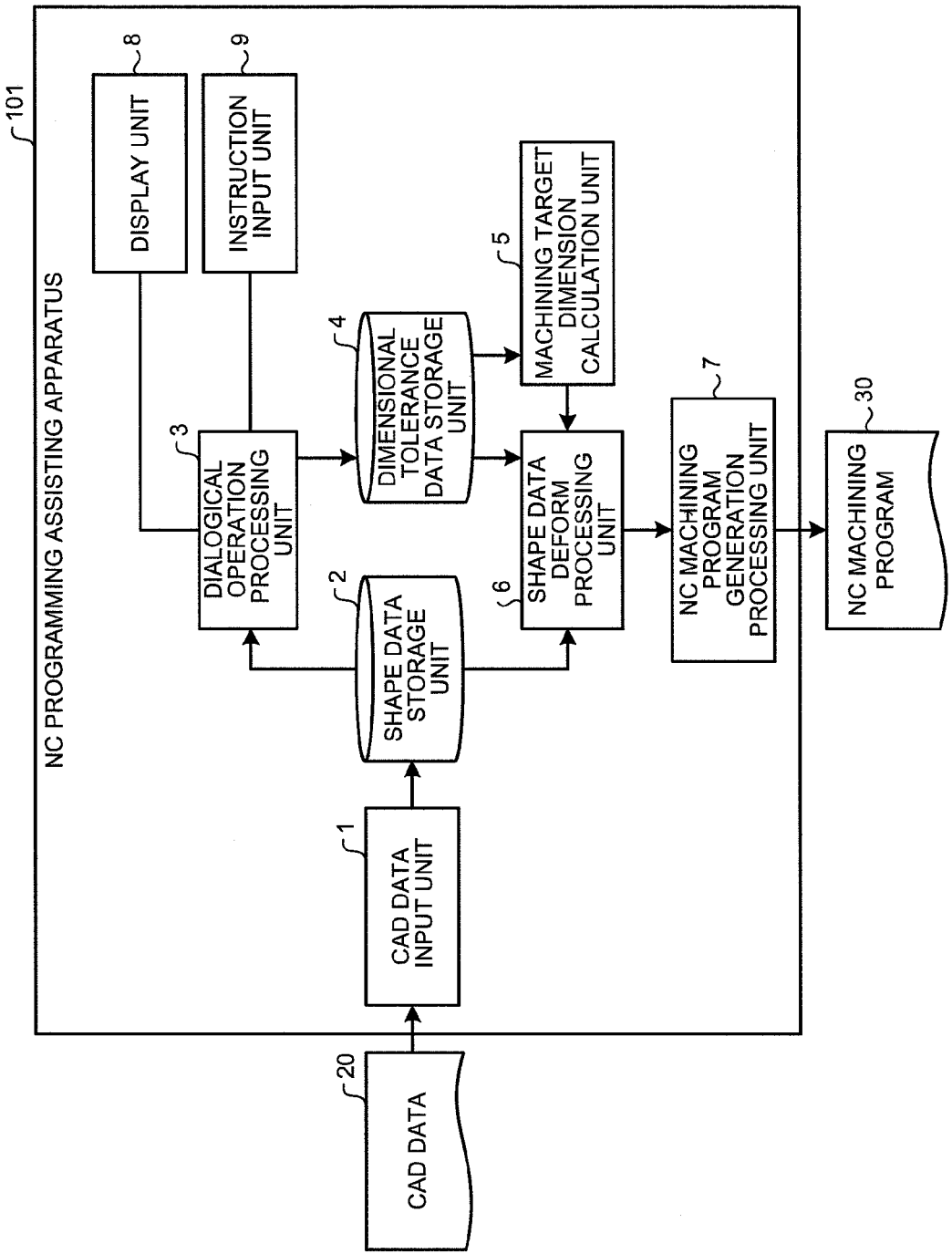
FIG. 1 is a block diagram of a configuration of an NC programming assisting apparatus according to a first embodiment.

1 CAD data input unit
2 shape data storage unit
3 dialogical operation processing unit
4 dimensional tolerance data storage unit
5 machining target dimension calculation unit
6 shape data deform processing unit
7 NC machining program generation processing unit
8 display unit
9 instruction input unit
10 point graphic data storage unit
20 CAD data
30 NC machining program
51, 52 dimensional tolerance data table
53 point graphic data table
61 to 63 shape data
101, 102 programming assisting apparatus
110 control unit
150 numerical control apparatus
201 machine device
205 machining unit
210 object to be machined
301A, 302A, 302B, 401A, 401B, 402A, 402B, 501A, 501B, 502A, 502B, 503A, 601A to 605A, 607A to 609A, 701A to 704A edge
801A, 801B point graphic

BEST MODE(S) FOR CARRYING OUT THE INVENTION

Embodiments of a program creation apparatus, a numerical control apparatus, and a program creation method according to the present invention are explained in detail based on the figures. The embodiments do not limit the scope of the present invention.

First Embodiment

FIG. 1 is a block diagram of a configuration of an NC programming assisting apparatus according to a first embodiment. An NC programming assisting apparatus (program creation apparatus) 101 includes a CAD data input unit 1, a shape data storage unit 2, a dialogical operation processing unit 3, a dimensional tolerance data storage unit 4, a machining target dimension calculation unit 5, a shape data deform processing unit 6, an NC machining program generation processing unit (machining program creation unit) 7, a display unit 8, and an instruction input unit 9.

The CAD data input unit 1 receives CAD data 20 from an external device such as a CAD data creating device and a CAD data memory device, and the like, and sends the CAD data 20 to the shape data storage unit 2. The CAD data 20 includes shape data of a machining subject (object to be machined) created by using a CAD system and the like (nominal dimension of the machining subject), data about dimensional tolerance set on the CAD system, and the like. The shape data storage unit 2 is a memory means such as a memory that memorizes the CAD data 20 sent from the CAD data input unit 1.

The display unit 8 is a display terminal such as a liquid crystal monitor that displays thereon the CAD data 20, graphic elements of shape data specified by a user, dimensional tolerance data input by a user, and the like.

The instruction input unit 9 includes a mouse and a keyboard, and receives instruction information (adjustment mode to be explained below or the like), dimensional tolerance data, and the like from a user. The instruction information, the dimensional tolerance data, and the like that the instruction input unit 9 has received are sent to the dialogical operation processing unit 3.

The dialogical operation processing unit 3 makes the display unit 8 display the CAD data 20 stored in the shape data storage unit 2, and receives instruction information from the instruction input unit 9. For example, the dialogical operation processing unit 3 receives, from the instruction input unit 9, the graphic elements of the shape data specified by an operator using a mouse or the like, and the corresponding dimensional tolerance data of the graphic elements input by the operator using a keyboard and the like. The dialogical operation processing unit 3 associates the graphic elements of the shape data of the CAD data 20 with the dimensional tolerance data based on the instruction information from the instruction input unit 9, and makes the dimensional tolerance data storage unit 4 memorize the associated data (a dimensional tolerance data table 51 to be explained below). The dimensional tolerance data storage unit 4 is a memory means such as a memory that memorizes the dimensional tolerance data table 51 sent from the dialogical operation processing unit 3.

The machining target dimension calculation unit 5 reads out the dimensional tolerance data table 51 stored in the dimensional tolerance data storage unit 4, and calculates a machining target dimension using a nominal dimension and a dimensional tolerance. The machining target dimension calculation unit 5 inputs the calculated machining target dimension to the shape data deform processing unit 6.

The shape data deform processing unit 6 calculates a movement amount of each graphic element, among the shape data, related to dimensional tolerance data using the calculation result of the machining target dimension calculation unit 5 (machining target dimension), the shape data stored in the shape data storage unit 2, and an adjustment mode, and deforms the shape data to satisfy the machining target dimension (move the position of the graphic element). The shape data deform processing unit 6 inputs the shape data to the NC machining program generation processing unit 7. The NC machining program generation processing unit 7 generates an NC machining program 30 based on the positions of the graphic elements of the deformed shape data after, and outputs the NC machining program 30 externally.

A configuration of the dimensional tolerance data table 51 stored in the dimensional tolerance data storage unit 4 is explained. FIG. 2 is a view illustrating an exemplary configuration of a dimensional tolerance data table. The dimensional tolerance data table 51 is an information table in which information for identifying the dimensional tolerance data ("No."), "graphic element 1", "graphic element 2", "dimension type", "nominal dimension", "upper dimensional deviation", "lower dimensional deviation", and "adjustment mode" are associated with each other. Each line in the dimensional tolerance data table 51 represents a piece of the dimensional tolerance data.

The field "graphic element 1" and the field "graphic element 2" represent a graphic element or a pair of graphic elements to which dimensional tolerance data is be set, and these fields are associated with an IDs ("No.") of the graphic elements (surfaces, edges, vertices, and the like) of shape data stored in the shape data storage unit 2. The field "graphic element 1" indicates one graphic element configuring shape data, and the field "graphic element 2" indicates the other graphic element configuring the shape data.

For dimensional tolerance of an axis or a hole diameter such as a fit, the dimensional tolerance is defined only by the "graphic element 1", and the field "graphic element 2" is ignored. The field "dimension type" indicates information indicating which type the dimensional tolerance data is, e.g., a distance, an angle, a diameter, and the like.

The field "nominal dimension" indicates a nominal dimension of the graphic element (dimension extracted from the CAD data 20, and the like). The field "upper dimensional deviation" and the field "lower dimensional deviation" indicate deviations, from the "nominal dimension" of the dimensional tolerance data, of the upper and lower permissible dimensions (i.e., upper limit of permissible dimension and lower limit of permissible dimension).

The field "adjustment mode", which is a principal feature of the present invention, indicates a movement/deformation method (manner of deforming shape data) (or, positional movement information about the manner of moving a graphic element) for moving/deforming graphic elements based on dimensional tolerance data. The "adjustment mode" indicates any of, for example, "Fix element 1", "Fix element 2", "Fix center", and "Automatic".

"Fix element 1" indicates a method of fixing the "graphic element 1" while moving the "graphic element 2", and "Fix element 2" indicates a method of fixing the "graphic element 2" while moving the "graphic element 1". "Fix center" indicates a method of fixing the center between the "graphic element 1" and the "graphic element 2" and moving the "graphic element 1" and the "graphic element 2" equally, and "Automatic" indicates a method of fixing either one of the "graphic element 1" and the "graphic element 2" that has been moved by the result of any one of "Fix element 1", "Fix element 2", and "Fix center" while moving the other graphic element that has not been moved.

In a case, as in a fit, where a single graphic element is the target, the field "adjustment mode" is ignored. Otherwise, the field "adjustment mode" is input by an operator or the like through the instruction input unit 9. Fields other than the "adjustment mode", e.g., the "graphic element 1", the "graphic element 2", the "dimension type", the "nominal dimension", the "upper dimensional deviation", and the "lower dimensional deviation" may be extracted from the CAD data 20, or may be input by an operator or the like through the instruction input unit 9.

The machining target dimension calculated by the machining target dimension calculation unit 5 is a dimensional value within a range that satisfies the "nominal dimension", the "upper dimensional deviation", and the "lower dimensional deviation" stored in the dimensional tolerance data table 51, and is determined based on the "nominal dimension", the "upper dimensional deviation", and the "lower dimensional deviation". The machining target dimension calculation unit 5 calculates the machining target dimension based on, for example, Equation (1).

machining target dimension=nominal dimension+
(upper dimensional deviation+lower dimensional
deviation)/2 (1)

The way of moving/deforming the graphic elements of the dimensional tolerance data depending on the type of the "adjustment mode" and the process of creating the dimensional tolerance data are explained using FIGS. 3 to 5. First, the movement/deformation method in the case where the "adjustment mode" of dimensional tolerance data is set to "Fix element 1" is explained. FIG. 3 is a view for explaining the method of moving/deforming shape data when the adjustment mode is "Fix element 1".

When "Fix element 1" is specified for the "adjustment mode" when an operator sets up dimensional tolerance data against edges 301A (graphic element 1) and 302A (graphic element 2) of shape data 61, the dialogical operation processing unit 3 creates dimensional tolerance data D11 in association with the shape data 61.

Specifically, for the dimensional tolerance data D11, the dialogical operation processing unit 3 extracts the edge 301A of the shape data 61 from the CAD data 20 to set the edge 301A as the "graphic element 1", and extracts the edge 302A from the CAD data 20 to set the edge 302A as the "graphic element 2". The "Fix element 1" specified by the operator is also included in the dimensional tolerance data D11 as the "adjustment mode". The dialogical operation processing unit 3 makes the dimensional tolerance data storage unit 4 store therein the dimensional tolerance data D11 in association with the shape data 61 of the CAD data 20.

When moving/deforming the edges 301A, 302A to satisfy the machining target dimension, the shape data deform processing unit 6 does not move, but fixes the edge 301A of the "graphic element 1" and moves the edge 302A of the "graphic element 2". The movement amount Δ in this case is the difference between a machining target dimension Y1 and a shape dimension before the deformation (distance between the edge 301A and the edge 302A before the movement/deformation) X1. The edge 302A of the shape data 61 becomes an edge 302B after the movement due to the process of movement by the movement amount Δ.

When the "adjustment mode" is "Fix element 2", the processing is the same as the processing in the case of "Fix element 1" except for the graphic elements to be fixed and moved are opposite. That is, in the case of "Fix element 2", the edge 302A of the "graphic element 2" is not moved, but fixed, and the edge 301A of the "graphic element 1" is moved.

Next, the movement/deformation method in the case where the "adjustment mode" of the dimensional tolerance data is "Fix center" is explained. FIG. 4 is a view for explaining the method of moving/deforming shape data when the adjustment mode is "Fix center".

When "Fix center" is specified as the "adjustment mode" when an operator sets up dimensional tolerance data against edges 401A (graphic element 1) and 402A (graphic element 2) of shape data 62, the dialogical operation processing unit 3 creates dimensional tolerance data D12 in association with the shape data 62.

Specifically, for the dimensional tolerance data D12, the dialogical operation processing unit 3 extracts the edge 401A of the shape data 62 from the CAD data 20 to set the edge 401A as the "graphic element 1", and extracts the edge 402A from the CAD data 20 to set the edge 402A as the "graphic element 2". "Fix center" specified by an operator is also included in the dimensional tolerance data D12 as the "adjustment mode". The dialogical operation processing unit 3 makes the dimensional tolerance data storage unit 4 store therein the dimensional tolerance data D12 in association with the shape data 62 of the CAD data 20.

When moving/deforming the edges 401A, 402A to satisfy the machining target dimension of the dimensional tolerance data D12, the shape data deform processing unit 6 does not move, but fixes the mid position (central line) between the edges 401A and 402A, and moves the edge 401A of the "graphic element 1" and the edge 402A of the "graphic element 2" by equal amounts. The movement amount Δ in this case is a half of the difference between a machining target dimension Y2 and a shape dimension before the deformation (distance between the edge 401A and the edge 402A before the movement/deformation) X2. The edge 401A of the shape data 62 becomes an edge 401B after the movement due to the process of movement by the movement amount Δ, and the edge 402A of the shape data 62 becomes an edge 402B after the movement due to the process of movement by the movement amount Δ.

Next, the movement/deformation method in the case where the "adjustment mode" of the dimensional tolerance data is "Automatic" is explained. FIG. 5 is a view for explaining the method of moving/deforming shape data when the adjustment mode is "Automatic".

It is assumed that the dimensional tolerance data storage unit 4 has stored therein dimensional tolerance data D13 against edges 502A, 503A. When "Automatic" is specified as the "adjustment mode" when an operator sets dimensional tolerance data for edges 501A (graphic element 1) and 502A (graphic element 2) of shape data 63, the dialogical operation processing unit 3 creates dimensional tolerance data D14 in association with the shape data 63.

In this case, either one of the field "graphic element 1" and the field "graphic element 2" of the dimensional tolerance data D14 is the same as either of the graphic elements in the dimensional tolerance data D13. Because the edge 502A and the edge 503A are involved as the graphic elements of the dimensional tolerance data D13 in the case of the shape data 63, the either field of the "graphic element 1" or "graphic element 2" of the dimensional tolerance data D14 is the edge 502A or the edge 503A. In FIG. 5, the field "graphic element 2" of the dimensional tolerance data D14 has the same value with that in the field "graphic element 1" of the dimensional tolerance data D13.

In the NC programming assisting apparatus 101, the dialogical operation processing unit 3 makes the dimensional tolerance data storage unit 4 store therein the dimensional tolerance data D14 in association with the shape data 63 of the CAD data 20. During this, for the dimensional tolerance data D14, the dialogical operation processing unit 3 extracts the edge 501A of the shape data 63 from the CAD data 20 to set the edge 501A as the "graphic element 1", and extracts the edge 502A from the CAD data 20 to set the edge 502A as the "graphic element 2". "Automatic" specified by an operator is also included in the dimensional tolerance data D14 as the "adjustment mode". The dialogical operation processing unit 3 makes the dimensional tolerance data storage unit 4 store therein the dimensional tolerance data D14 in association with the shape data 62 of the CAD data 20.

When moving/deforming the edges 501A, 502A to satisfy the machining target dimension of the dimensional tolerance data D14, the shape data deform processing unit 6 temporarily suspends movement/deformation of the dimensional tolerance data D14 until movement/deformation of another piece of dimensional tolerance data sharing graphic elements (in this case, the dimensional tolerance data D13) ends.

When the movement/deformation of the dimensional tolerance data D13 ends, the shape data deform processing unit 6 fixes the graphic elements of the dimensional tolerance data D13 that have been moved/deformed, and executes the movement/deformation of the dimensional tolerance data D14.

In the case of the shape data 63 shown in FIG. 5, because the "Fix element 2" is specified for the dimensional tolerance data D13, the edge 503A of the "graphic element 2" is fixed, and the edge 502A of the "graphic element 1" is moved and becomes an edge 502B (s1). Thus, the machining target dimension of the "graphic element 1" and the "graphic element 2" of the dimensional tolerance data D13 conforms to the machining target dimension Y3 corresponding to the dimensional tolerance data D13.

Thereafter, because "Automatic" is specified for the dimensional tolerance data D14, the "graphic element 2" (edge 502A) of the dimensional tolerance data D14 that is identical to the "graphic element 1" of the dimensional tolerance data D13 is fixed. Then, the "graphic element 1" (edge 501A) of the dimensional tolerance data D14 is moved and becomes an edge 501B (s2). Thus, the machining target dimension of the "graphic element 1" and the "graphic element 2" of the dimensional tolerance data D14 conforms to the machining target dimension Y4 corresponding to the dimensional tolerance data D14.

In other words, in the present embodiment, the shape data deform processing unit 6 moves/deforms an opposite graphic element (edge 501A) to satisfy the machining target dimension by using the graphic element that has been moved/deformed (in this case, the edge 502A) as a reference.

When the adjustment mode of dimensional tolerance data that does not share graphic elements with other dimensional tolerance data is "Automatic", the "adjustment mode" is regarded as, for example, "Fix center" in which graphic elements on both sides are equally moved/deformed.

Figure 6:
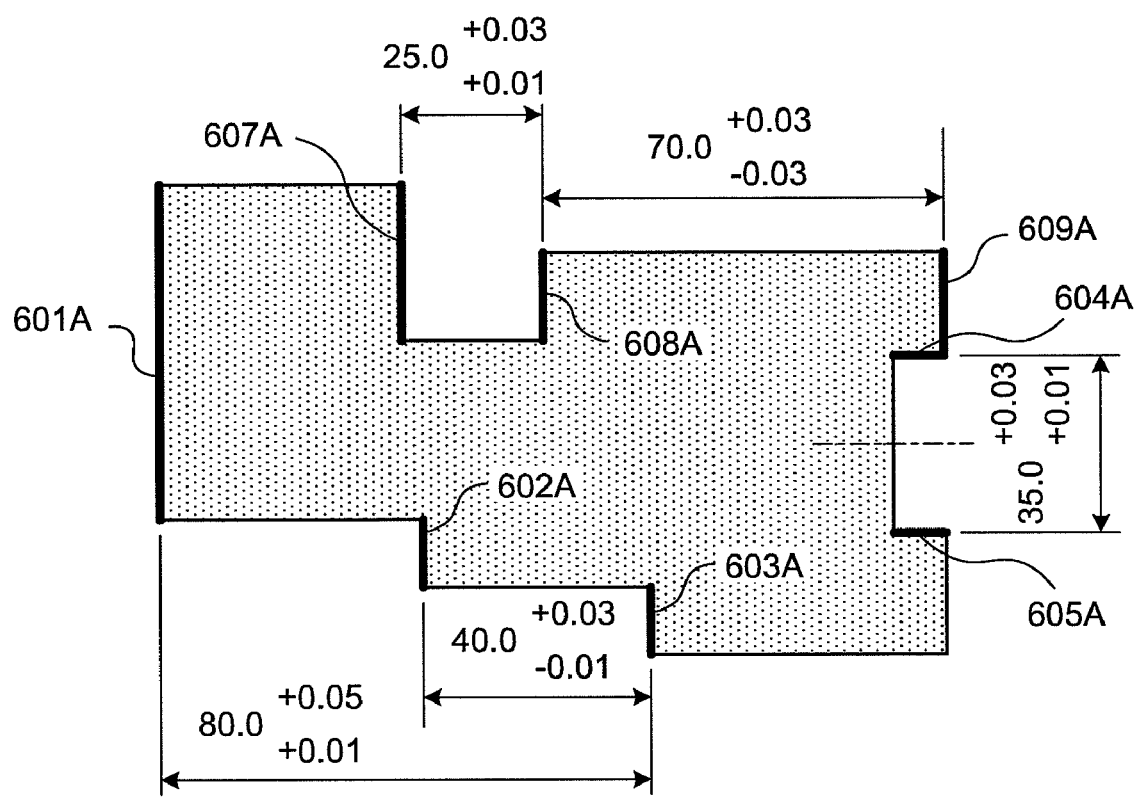
FIG. 6 is a schematic view illustrating an example of a machining subject shape and dimensional tolerance data.

An operation procedure of the NC programming assisting apparatus according to the first embodiment is explained with reference to FIGS. 6 to 8. FIG. 6 is a view illustrating an example of a machining subject shape and dimensional tolerance data. In FIG. 6, dimensions of five parts specified by a designer of the machining subject shape and dimensional tolerance are shown as an example, and other dimensions are omitted for convenience of explanation.

Edges 601A to 605A and 607A to 609A are included in the machining subject shape of FIG. 6. The "nominal dimension" (distance) between the edge 601A and the edge 603A is 80.0 (millimeters), the "upper dimensional deviation" is +0.05, and the "lower dimensional deviation" is +0.01. The "nominal dimension" between the edge 602A and the edge 603A is 40.0, the "upper dimensional deviation" is +0.03, and the "lower dimensional deviation" is −0.01.

The "nominal dimension" between the edge 604A and the edge 605A is 35.0, the "upper dimensional deviation" is +0.03, and the "lower dimensional deviation" is +0.01. The "nominal dimension" between the edge 607A and the edge 608A is 25.0, the "upper dimensional deviation" is +0.03, and the "lower dimensional deviation" is +0.01. The "nominal dimension" between the edge 608A and the edge 609A is 70.0, the "upper dimensional deviation" is +0.03, and the "lower dimensional deviation" is −0.03.

FIG. 7 is a view illustrating a configuration of a dimensional tolerance data table having asymmetric dimensional tolerances among the dimensions shown in FIG. 6. In FIG. 7, the content of the dimensional tolerance data storage unit 4 when an operator sets up dimensional tolerance data for the five dimensions having asymmetric tolerances shown in FIG. 6 is shown. A dimensional tolerance data table 52 of FIG. 7 further includes information about group names to which dimensional tolerance data belongs, in addition to the elements of the dimensional tolerance data table 51.

As for the dimensional tolerance data D21, the "graphic element 1" is the edge 601A and the "graphic element 2" is the edge 603A. Because the "adjustment mode" of the dimensional tolerance data D21, where the nominal dimension of 80 millimeters is specified, is "Fix element 1", the shape data deform processing unit 6 does not move the edge 601A.

As for the dimensional tolerance data D22, the "graphic element 1" is the edge 602A and the "graphic element 2" is the edge 603A. The dimensional tolerance data D22, where the nominal dimension of 40 millimeters is specified, shares the edge 603A with the dimensional tolerance data D21, and the adjustment mode is "Automatic". Accordingly, the shape data deform processing unit 6 does not move the edge 603A.

As for the dimensional tolerance data D23, the "graphic element 1" is the edge 604A and the "graphic element 2" is the edge 605A. Because the "adjustment mode" of the dimensional tolerance data D23, where the nominal dimension of 35 millimeters is specified, is "Fix center", the shape data deform processing unit 6 moves the edges 604A, 605A so that the graphic elements become symmetric about the central line of the graphic elements.

As for the dimensional tolerance data D24, the "graphic element 1" is the edge 607A and the "graphic element 2" is the edge 608A. Because the "adjustment mode" of the dimensional tolerance data D24, where the nominal dimension of 25 millimeters is specified, is "Fix element 2", the shape data deform processing unit 6 does not move the edge 608A.

Because the dimensional tolerance data (for edges 608A, 609A) with the nominal dimension value of 70 millimeters has the "upper dimensional deviation" of +0.03 and the "lower dimensional deviation" of −0.03, the shape data deform processing unit 6 does not move the edges 608A, 609A.

Among the dimensional tolerance data D21 to D24, the dimensional tolerance data D21, D22 share the edge 603A. Accordingly, the dimensional tolerance data D21, D22 are made to be dimensional tolerance data that belong to a group G1. On the other hand, the dimensional tolerance data D23, D24 do not share graphic elements with other dimensional tolerance data. Accordingly, each of the dimensional tolerance data D23, D24 is made to be dimensional tolerance data that belongs to a group G2, G3 respectively, and not to the group G1.

Figure 8:
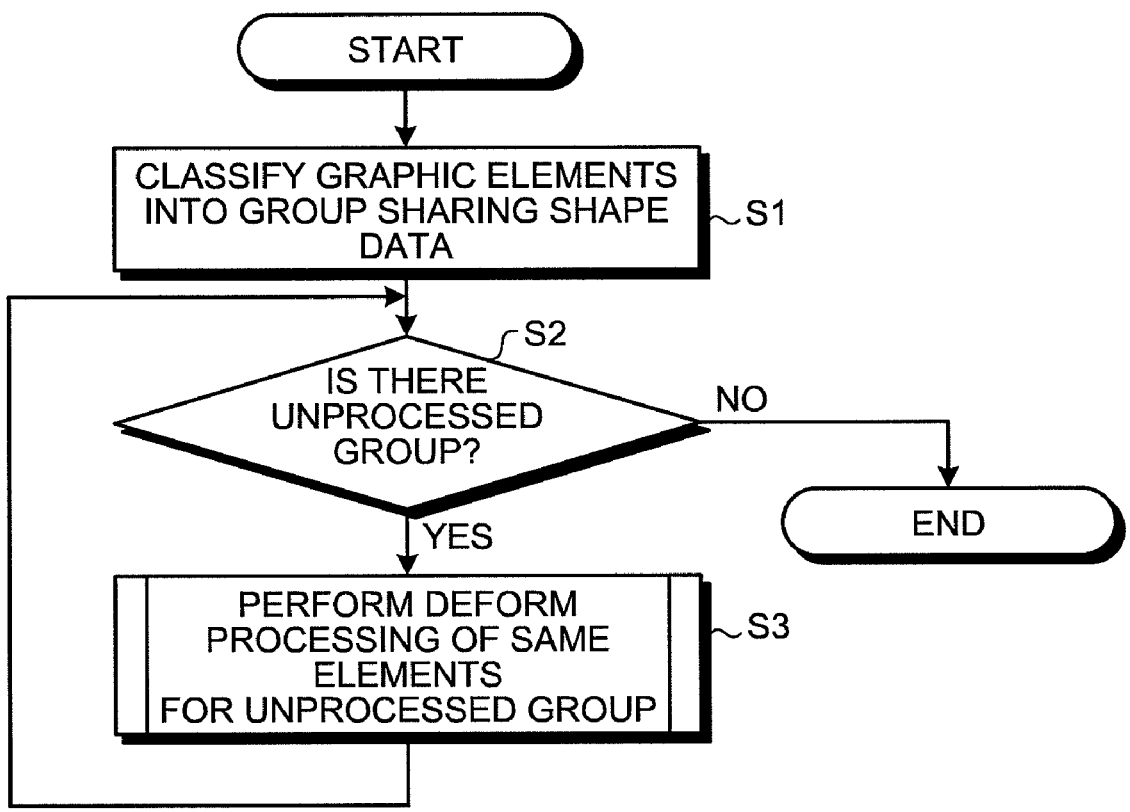
FIG. 8 is a flowchart of an operation procedure of the NC programming assisting apparatus according to the first embodiment of the present invention.

FIG. 8 is a flowchart of an operation procedure of the NC programming assisting apparatus according to the first embodiment of the present invention. In FIG. 8, an example of an operation procedure of the shape data deform processing unit 6 is shown.

The shape data deform processing unit 6 classifies the dimensional tolerance data in the dimensional tolerance data table 51 stored in the dimensional tolerance data storage unit 4 into groups having common graphic elements (Step S1).

The shape data deform processing unit 6 calculates movement amounts of graphic elements for each classified group by using calculation results (machining target dimensions) of the machining target dimension calculation unit 5 and using shape data stored in the shape data storage unit 2. The shape data deform processing unit 6 checks if there remains an unprocessed group which has a graphic element whose movement amount has not been calculated (Step S2). When the shape data deform processing unit 6 finds an unprocessed group that has any graphic element whose movement amount has not been calculated (YES at Step S2), the shape data deform processing unit 6 calculates the movement amount of the graphic element in the unprocessed group, and deforms the shape data (deformation calculation) (Step S3).

The shape data deform processing unit 6 repeats the deformation process for each group until no unprocessed group remains (Steps S2 to S3). When there is no remaining unprocessed group that has any graphic element whose movement amount has not been calculated (NO at Step S2), the shape data deform processing unit 6 ends the process of deforming graphic elements.

Figure 9:
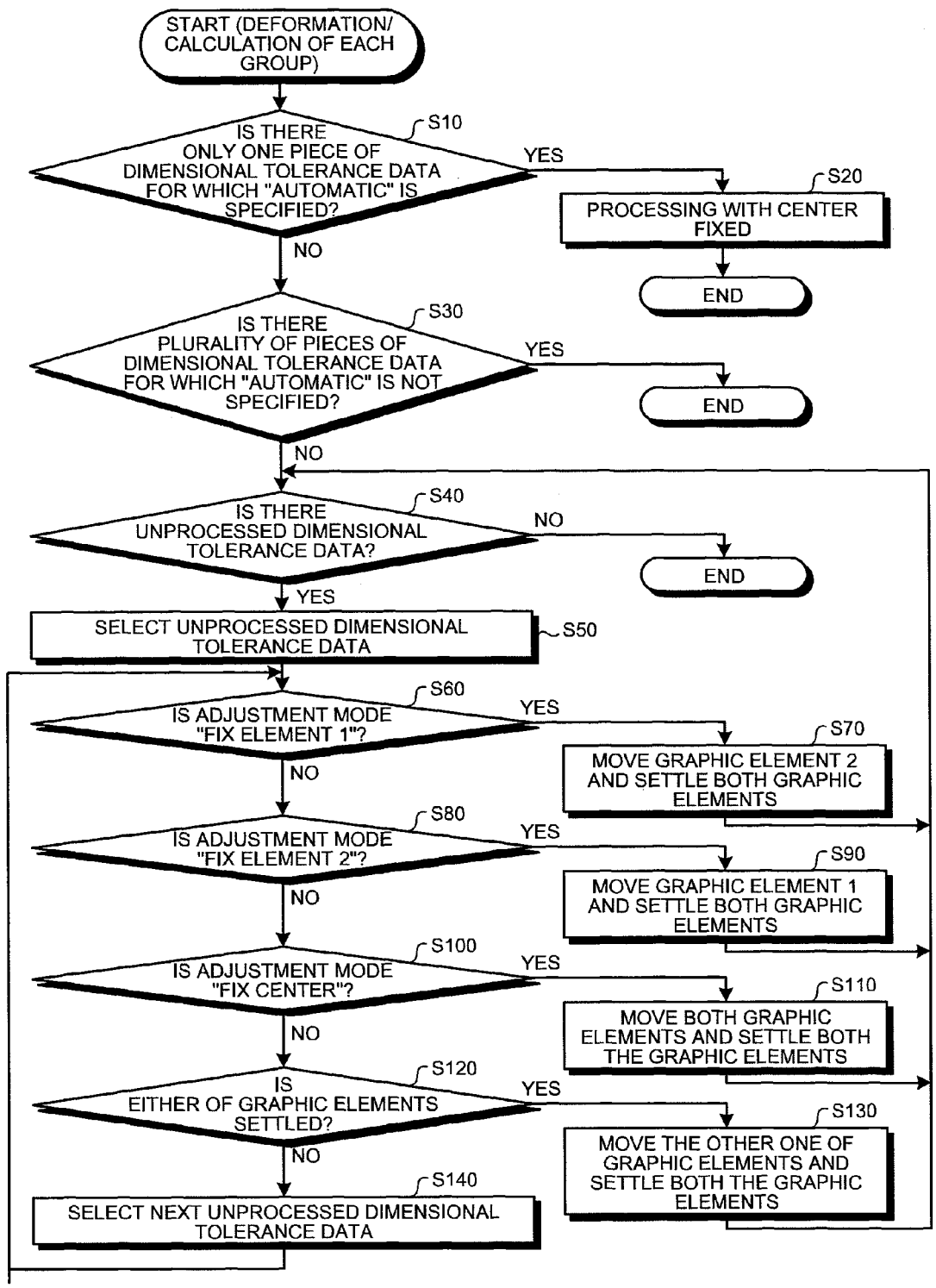
FIG. 9 is a flowchart of a processing procedure of deforming graphic elements for each group.

The process at Step S3 (process of deforming graphic elements of each group) is explained in detail. FIG. 9 is a flowchart of a processing procedure of deforming graphic elements of each group. In FIG. 9, a procedure of the shape data deform processing unit 6 performing the process of deforming graphic elements for a group is shown.

The shape data deform processing unit 6 judges whether only one piece of the dimensional tolerance data belonging to the group being processed is present, and the "adjustment mode" of the dimensional tolerance data is "Automatic" (Step S10).

When only one piece of the dimensional tolerance data belonging to the group is present, and the "adjustment mode" of the dimensional tolerance data="Automatic" (YES at Step S10), the shape data deform processing unit 6 performs the process of deforming graphic elements (by default) as in the case where the "adjustment mode" is "Fix center", and ends the process of deforming graphic elements (Step S20). Thereafter, when the shape data deform processing unit 6 finds the process of deforming graphic elements of a next group, the shape data deform processing unit 6 repeats the process of Steps S2, S3 shown in the flowchart of FIG. 8 (return).

When a plurality of pieces of the dimensional tolerance data belonging to the group are present, or dimensional tolerance data that is not "adjustment mode"="Automatic" is included in the group (NO at Step S10), the shape data deform processing unit 6 judges whether a plurality of pieces of the dimensional tolerance data that are not "adjustment mode"="Automatic" are included in the group being processed (Step S30).

When pieces of the dimensional tolerance data that are not "adjustment mode"="Automatic" are included in the group being processed (YES at Step S30), the shape data deform processing unit 6 determines the process of deforming graphic elements as impossible, and terminates the process as error. In addition, when pieces of the dimensional tolerance data that are "adjustment mode"="Automatic" are included in the group being processed, the shape data deform processing unit 6 also determines the process of deforming graphic elements as impossible, and terminates the process as error.

When only one piece of the dimensional tolerance data that is not "adjustment mode"="Automatic" is included in the group being processed (NO at Step S30), the shape data deform processing unit 6 repeats the process on each piece of the dimensional tolerance data until no unprocessed dimensional tolerance data is present (Steps S40 to S140).

Specifically, the shape data deform processing unit 6 checks whether unprocessed dimensional tolerance data is present (Step S40). When unprocessed dimensional tolerance data is present (YES at Step S40), the shape data deform processing unit 6 selects a piece of the unprocessed dimensional tolerance data (Step S50).

Then, the shape data deform processing unit 6 judges whether the "adjustment mode" of the selected dimensional tolerance data is "Fix element 1" (Step S60). When the "adjustment mode" of the dimensional tolerance data is "Fix element 1" (YES at Step S60), the shape data deform processing unit 6 fixes the "graphic element 1" and moves the "graphic element 2" to settle the positions of the "graphic element 1" and the "graphic element 2" (Step S70).

When the "adjustment mode" of the dimensional tolerance data is not "Fix element 1" (NO at Step S60), the shape data deform processing unit 6 judges whether the "adjustment mode" of the selected dimensional tolerance data is "Fix element 2" (Step S80). When the "adjustment mode" of the dimensional tolerance data is "Fix element 2" (YES at Step S80), the shape data deform processing unit 6 fixes the "graphic element 2" and moves the "graphic element 1" to settle the positions of the "graphic element 1" and the "graphic element 2" (Step S90).

When the "adjustment mode" of the dimensional tolerance data is not "Fix element 2" (NO at Step S80), the shape data deform processing unit 6 judges whether the "adjustment mode" of the selected dimensional tolerance data is "Fix center" (Step S100). When the "adjustment mode" of the dimensional tolerance data is "Fix center" (YES at Step S100), the shape data deform processing unit 6 fixes the central part between the "graphic element 1" and the "graphic element 2", moves (moves/deforms) the "graphic element 1" and the "graphic element 2" equally, and settles the positions of the "graphic element 1" and the "graphic element 2" (Step S110).

When the "adjustment mode" of the dimensional tolerance data is not "Fix center" (NO at Step S100), the shape data deform processing unit 6 judges whether the position of either the "graphic element 1" and the "graphic element 2" of the selected dimensional tolerance data has been settled (Step S120). When the position of either the "graphic element 1" and the "graphic element 2" has been settled (YES at Step S120), because the "adjustment mode" is "Automatic", the shape data deform processing unit 6 moves the "graphic element 1" or the "graphic element 2" whose position has not been settle (the other graphic element) to settle the positions of the "graphic element 1" and the "graphic element 2" (Step S130). At this time, the graphic element whose position has been settled is fixed, and is not moved.

When the positions of both the "graphic element 1" and the "graphic element 2" have not been settled (NO at Step S120), the shape data deform processing unit 6 selects next unprocessed dimensional tolerance data (Step S140). In other words, when the positions of both the "graphic element 1" and the "graphic element 2" have not been settled, the moving process is temporarily suspended, and the other unprocessed dimensional tolerance data is processed first. Then, the shape data deform processing unit 6 performs processing among Steps S60 to S140 corresponding to dimensional tolerance data (next unprocessed dimensional tolerance data) selected in accordance with the suspension of the moving process on the selected dimensional tolerance data.

After the positions of the "graphic element 1" and the "graphic element 2" are settled (after the processing of Steps S70, S90, S110, and S130), the shape data deform processing unit 6 checks whether unprocessed dimensional tolerance data is present (Step S40).

The shape data deform processing unit 6 repeats the processing of Steps S40 to S140 until no unprocessed dimensional tolerance data is present. When no unprocessed dimensional tolerance data is present (NO at Step S40), the shape data deform processing unit 6 ends the process of deforming graphic elements included in the group being processed.

When the shape data deform processing unit 6 ends the process of deforming shape data, the NC machining program generation processing unit 7 generates an NC machining program based on the shape and the position of each graphic element of the deformed shape data, and outputs the NC machining program externally.

Therefore, because an operator can easily estimate a result of deforming a machining subject shape reflecting a dimensional tolerance, an appropriate NC machining program reflecting intent of a designer (dimensional tolerance) can be created easily and efficiently. Because dimensional tolerance data can be set only to the region related to shape deformation, a desired NC machining program can be created easily with less labor.

Although at Step S20, a graphic element is deformed as in the case that the "adjustment mode" is "Fix center" when only one piece of dimensional tolerance data in a group (the "adjustment mode" is "Automatic") is present, the graphic element may be deformed in other ways. For example, the graphic element may be deformed as in the case that the "adjustment mode" is "Fix element 1" or "Fix element 2".

The method of the machining target dimension calculation unit 5 calculating a machining target dimension is not limited to the calculation method using Equation (1). For example, the machining target dimension may be calculated by using a value obtained by applying a predetermined ratio (for example, 3:1) to the upper dimensional deviation and the lower dimensional deviation. For example, when a value obtained by applying a ratio of n:m to the upper dimensional deviation and the lower dimensional deviation, the machining target dimension calculation unit 5 calculates the machining target dimension based on Equation (2).

$$\text{machining target dimension} = \text{nominal dimension} + ((m \times \text{upper dimensional deviation}) + (n \times \text{lower dimensional deviation}))/(n+m) \quad (2)$$

Although, in the present embodiment, the process of deforming graphic elements is explained by taking two-dimensional shape data as an example, the NC programming assisting apparatus 101 may perform the processing of deforming graphic elements on three-dimensional shape data. Even in this case, graphic elements can be deformed with a configuration and by a procedure similar to those in the case that shape data is two-dimensional.

The values (classification) of the "adjustment mode" is not limited to the four types, "Fix element 1", "Fix element 2", "Fix center", and "Automatic". For example, it can be a data type that specifies the ratio of allocating the difference between a machining target dimension and shape dimension to the graphic elements on both ends. In such case, allocating the difference to the graphic elements on both ends in, for example, 50%:50% has the equivalent meaning to "Fix center".

Shape data of a machining subject memorized in the shape data storage unit 2 is not limited to the shape data of the CAD data 20, but may be other data. Items in the dimensional tolerance data other than the "adjustment mode" need not be extracted from the CAD data 20, but may be supplemented by an operator as needed.

By incorporating the NC programming assisting apparatus 101 according to the first embodiment in a numerical control apparatus of a machine tool, it becomes possible for the machine tool to directly execute an NC machining program created by the NC programming assisting apparatus 101.

As can be seen, according to the first embodiment, when creating an NC machining program of a machining subject including a portion having a machining target dimension different from a dimension of shape data (shape data for which an asymmetric fit or dimensional tolerance having one-sided upper and lower dimensional deviations is specified), a desired output result (NC machining program) can be obtained by only setting dimensional tolerance data (such as an adjustment mode) to only the graphic elements related to fits and dimensional tolerances. Thus, setting dimensional tolerance data can be omitted for a portion not related to movement/deformation of a graphic element, and labor for creating an NC machining program can be reduced. Accordingly, an NC machining program reflecting design intent represented in a dimensional tolerance can be created easily.

When a graphic element is shared by pieces of the dimensional tolerance data, a post-movement position of the shared graphic element is set so that the shared graphic element has a dimension corresponding to a machining target dimension of each piece of the dimensional tolerance data sharing the graphic element; therefore, even when a graphic element is shared by pieces of the dimensional tolerance data, an NC machining program can be created easily.

Second Embodiment

A second embodiment of the present invention is explained with reference to FIGS. 10 to 13. In the second embodiment, a plurality of graphic elements are unified as a graphic element group, and a representative reference point of the graphic element group is moved to create an NC machining program of a machining subject.

Figure 10:
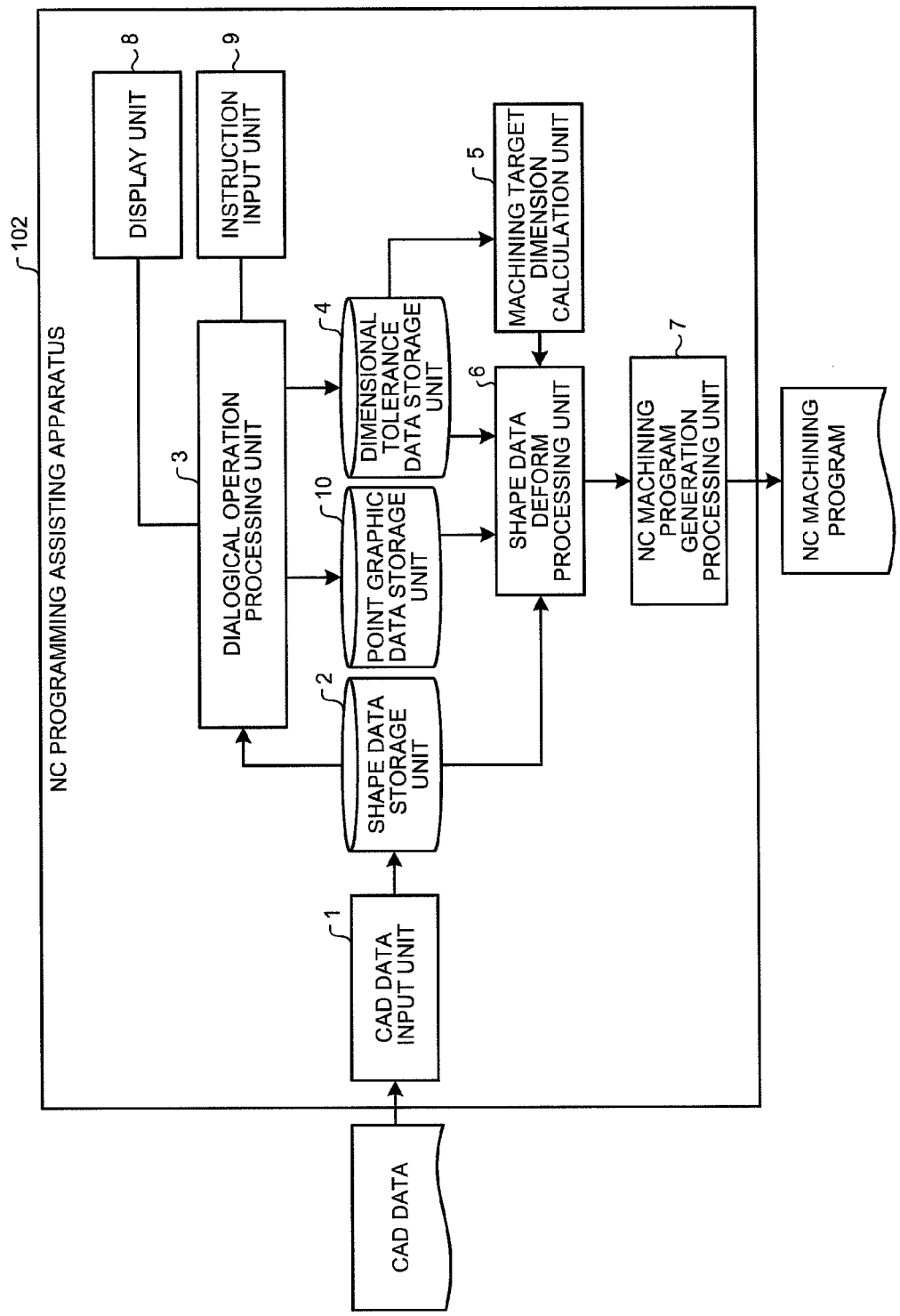
FIG. 10 is a block diagram of a configuration of an NC programming assisting apparatus according to a second embodiment of the present invention.

FIG. 10 is a block diagram of a configuration of an NC programming assisting apparatus according to the second embodiment of the present invention. Components in FIG. 10 having the same functions as the counterparts of the NC programming assisting apparatus 101 according to the first embodiment shown in FIG. 1 are given the same numbers, and the explanation is not repeated.

An NC programming assisting apparatus 102 includes a point graphic data storage unit 10 in addition to functions of the NC programming assisting apparatus 101 (the CAD data input unit 1, the shape data storage unit 2, the dialogical operation processing unit 3, the dimensional tolerance data storage unit 4, the machining target dimension calculation unit 5, the shape data deform processing unit 6, the NC machining program generation processing unit 7, the display unit 8, the instruction input unit 9). The point graphic data storage unit 10 is a memory means such as a memory that memorizes information about a graphic element group of shape data (a point graphic data table 53 explained below).

The dialogical operation processing unit 3 of the NC programming assisting apparatus 102 performs the processing of setting a dimensional tolerance, and additionally unifies graphic elements of shape data specified by an operator as a graphic element group. Then, the dialogical operation processing unit 3 creates a point graphic at a position of the representative reference point of the unified graphic element group, and stores point graphic data in which the point graphic and the graphic element group are associated with each other as a point graphic data table in the point graphic data storage unit 10. Furthermore, in the operation of setting a dimensional tolerance, the dialogical operation processing unit 3 sets a dimensional tolerance with the point graphic as a setting subject, in addition to a graphic element representing a machining subject shape.

When moving/deforming a graphic element related to dimensional tolerance data to satisfy a machining target dimension, the shape data deform processing unit 6 of the NC programming assisting apparatus 102 reads out the point graphic data stored in the point graphic data storage unit 10, and moves/deforms the graphic element group associated with the point graphic data in coordination with movement of the point graphic when the subject of movement/deformation is a point graphic. In other words, shape data made up of a plurality of pieces is treated as point data indicating a single graphic element group in the present embodiment. A dimensional tolerance of each graphic element is made dimensional tolerance data 0 in a graphic element group treated as point data, and each graphic element is relatively moved by the same amount with the movement of the point data.

A configuration of the point graphic data table stored in the point graphic data storage unit 10 is explained. FIG. 11 is a view illustrating an exemplary configuration of a point graphic data table. In FIG. 11, each line represents a single piece of the point graphic data.

In the point graphic data table 53, information ("ID") for identifying point graphic data, "X-coordinate", "Y-coordinate", and a list ("graphic element list") of graphic elements associated with the point graphic data are associated with each other.

The field "ID", which is a number that can identify each point graphic uniquely, is chosen so that it does not overlap with an ID of a graphic element representing a machining subject shape. The field "X-coordinate" and the field "Y-coordinate" indicate coordinates of the position of a representative reference point of the graphic element group associated with the point graphic (coordinate of the point graphic). The field "graphic element list" indicates a list of IDs of each piece of graphic data (graphic elements) in the graphic element group associated with the point graphic.

Figure 12:
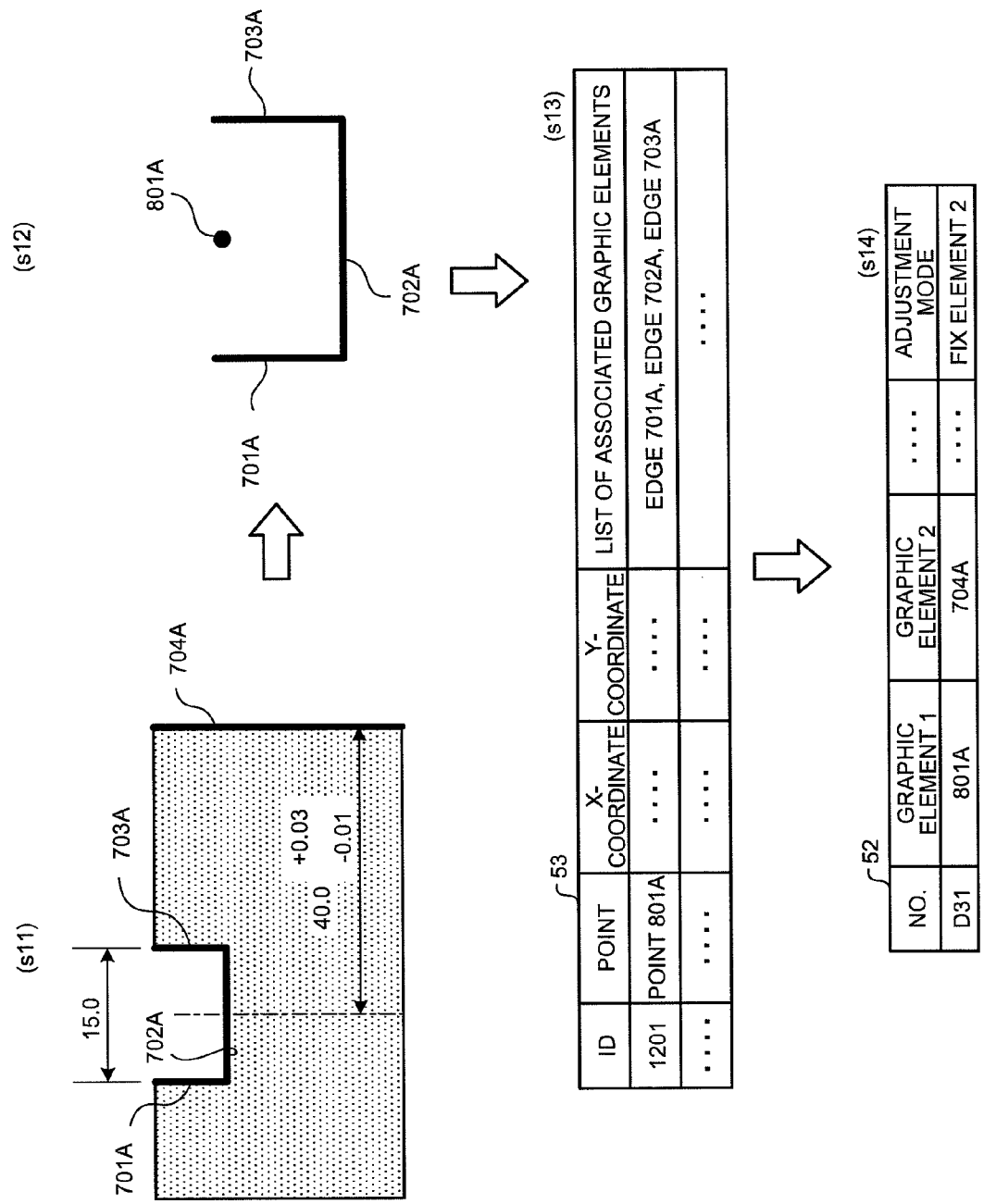
FIG. 12 is a view for explaining a method of moving/deforming point graphic data.

An operation procedure of the NC programming assisting apparatus according to the second embodiment is explained with reference to FIGS. 12 and 13. FIG. 12 is a view illustrating an example of a machining subject shape, point graphic data, and dimensional tolerance data. In the example of FIG. 12, a designer has specified a dimensional tolerance between the center of a groove shape with a width of 15 millimeters consisting of edges 701A, 702A, and 703A and an edge 704A (s11).

The dialogical operation processing unit 3 unifies the graphic element group (edges 701A, 702A, 703A) configuring the groove shape based on an instruction from an operator, and creates a point graphic 801A with its central position being the representative reference point (s12).

The dialogical operation processing unit 3 makes the point graphic data table 53 of the point graphic data storage unit 10 memorize the point graphic data in which the point graphic 801A is specified. The point graphic data registered in the point graphic data table 53 includes the point graphic 801A that is the representative reference point of the graphic element group, the X-coordinate and the Y-coordinate of the point graphic 801A, the "graphic element list" (IDs of the edges 701A, 702A, and 703A), and the like (s13).

The dialogical operation processing unit 3 sets the dimensional tolerance data (the adjustment mode or the like) between the center of the groove shape (the point graphic 801A) and the edge 704A, and makes the dimensional tolerance data table 52 of the dimensional tolerance data storage unit 4 memorize the center (s14). The dimensional tolerance data between the point graphic 801A and the edge 704A is set based on the X-coordinate and the Y-coordinate of the point graphic 801A, the shape data in the CAD data 20, an instruction from an operator, or the like.

Because the point graphic is included in a setting subject graphic of the dimensional tolerance data (the process of deforming a graphic element) in the present embodiment, the shape data deform processing unit 6 moves the position of the point graphic 801A as needed in the process of deforming the graphic element.

Figure 13:
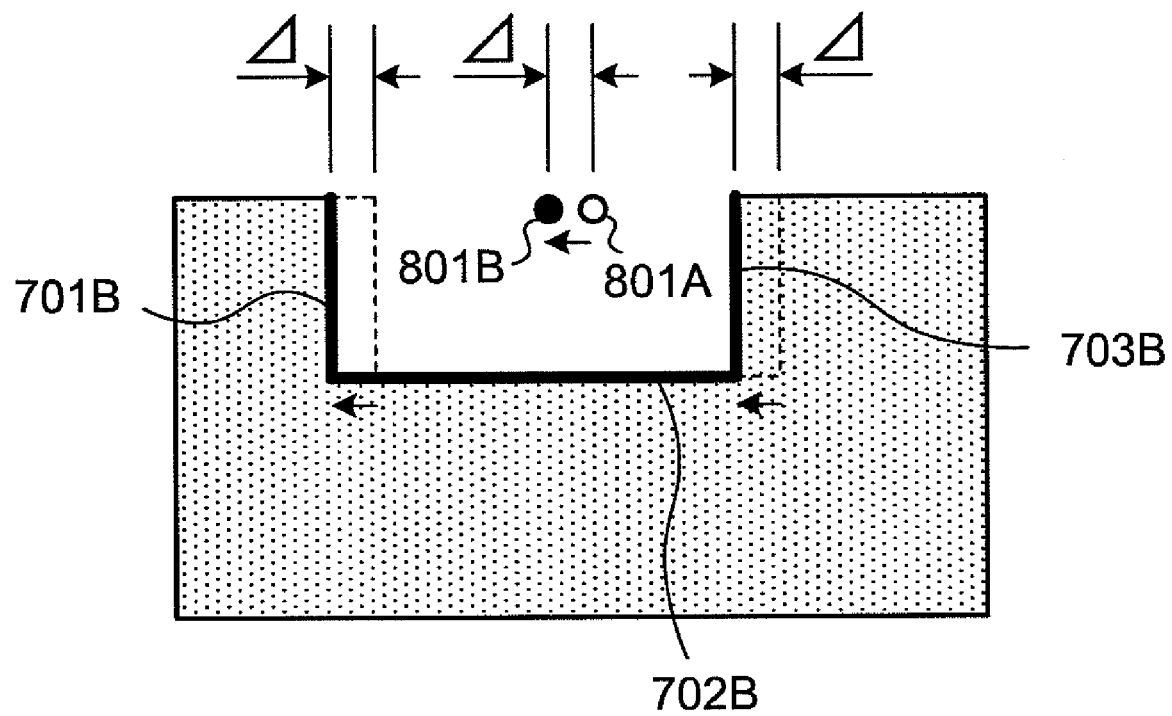
FIG. 13 is a view for explaining a method of moving/deforming a graphic element group associated with a point graphic.

FIG. 13 is a view for explaining a method of moving/deforming a graphic element group associated with a graphic point when the point graphic is moved. In FIG. 13, the process of moving edges 701A, 702A, and 703A in the case of moving the point graphic 801A shown in FIG. 12 is shown.

As shown in FIG. 13, when the point graphic 801A is moved to the position of the point graphic 801B, the edges 701A, 702A, and 703A associated with the point graphic 801A are moved/deformed in coordination with the movement of the point graphic 801A by the movement amount equal to the movement amount of the point graphic 801A. In this case, the edges 701A, 702A, and 703A are moved in a direction the same as the moving direction from the point graphic 801A to the point graphic 801B.

Therefore, an operator can easily predict a deformation result of a machining subject shape reflecting a dimensional tolerance of a machining subject (graphic element group) whose shape and size are unchanged, but position is changed due to the influence of the dimensional tolerance. It becomes thus possible to easily and efficiently create an appropriate NC machining program reflecting intent of a designer. Because dimensional tolerance data has to be set only for a portion related to deformation as in the first embodiment (NC programming assisting apparatus 101), a desired NC machining program can be created with less labor.

Although in the present embodiment the process of deforming a graphic element is explained by taking two-dimensional data as an example, the NC programming assisting apparatus 102 may perform the process of deforming a graphic element on three-dimensional shape data. Even in this case, the process of deforming a graphic element can be performed with a configuration and by a procedure similar to those when the shape data is two-dimensional.

By incorporating the NC programming assisting apparatus 102 in a numerical control apparatus of the machine tool, it becomes possible for the machine tool to directly execute an NC machining program created by the NC programming assisting apparatus 102.

Figure 14:
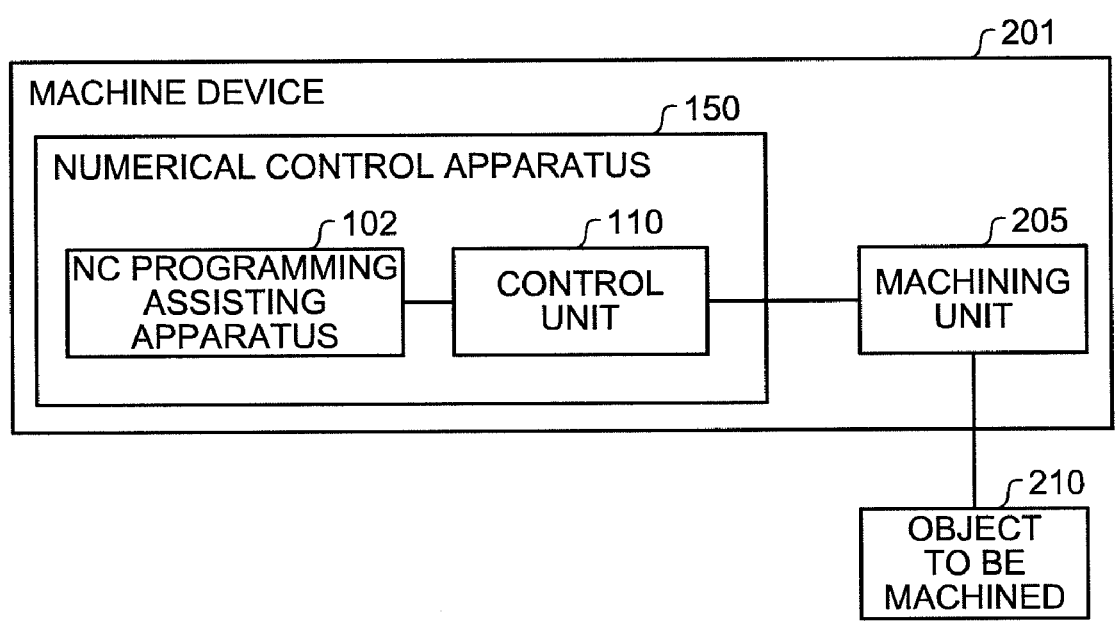
FIG. 14 is a block diagram of an example of a configuration of a machine device.

A configuration of a machine tool is explained. FIG. 14 is a block diagram of an exemplary configuration of a machine device. A machine device (machine tool) 201 includes a numerical control apparatus 150 and a machining unit 205, and the machining unit 205 machines an object to be machined 210 based on a control instruction from the numerical control apparatus 150.

The numerical control apparatus 150 includes an NC programming assisting apparatus 102 and a control unit 110, and the control unit 110 controls the machining unit 205 using an NC program created by the NC programming assisting apparatus 102. The machine device 201 can thus execute the NC machining program created by the NC programming assisting apparatus 102 to machine the object to be machined 210. The NC programming assisting apparatus to be incorporated in the numerical control apparatus 150 is not limited to the NC programming assisting apparatus 102, but may be the NC programming assisting apparatus 101.

Although in the present embodiment the point graphic 801A is moved based on the dimensional tolerance data between the point graphic 801A and the edge 704A, the point graphic may be moved based on the dimensional tolerance data set between a point graphic and a point graphic. The position of the point graphic 801A need not be moved, but the position of a graphic data such as an edge may be moved. The position of a representative reference point of a graphic element group is not limited to the central position of the graphic element group, but may be any position. The reference position of the graphic element group may be a segment or a surface other than a point graphic.

As can be seen, according to the second embodiment, when creating an NC machining program of a machining subject containing a portion (graphic element group) to be appear in a different position with respect to the machining subject as a whole due to assymetric demensional tolerances specified while the shape and the size of the portion are locally the same as those of the corresponding portion of the original shape data, a desired output result (NC machining program) can be obtained by only setting dimensional tolerance data (adjustment mode) for a point graphic representing the portion, without setting dimensional tolerance data for each graphic element configuring the portion.

Thereby, an NC machining program can be obtained by only setting fewer pieces of dimensional tolerance data, and the labor of creating an NC machining program can be reduced. Accordingly, an NC machining program reflecting design intent represented in a dimensional tolerance can be created easily.

The process of creating an NC machining program explained in the first and the second embodiments may be performed by executing a previously prepared program with a computer such as a personal computer.

INDUSTRIAL APPLICABILITY

As explained above, the program creation apparatus, the numerical control apparatus, and the program creation method according to the present invention are suited for creating an NC machining program for numerically controlling a machine tool.

The invention claimed is:

1. A program creation apparatus that creates, based on shape data of a machining subject and dimensional tolerance data of the shape data, an NC machining program reflecting the dimensional tolerance data on the shape data, the program creation apparatus comprising:
   a memory which stores a plurality of units; and
   a processor which executes the stored plurality of units, the plurality of units comprising:
      a machining target dimension calculation unit that calculates machining target dimensions of the machining subject based on the shape data and the dimensional tolerance data;
      a shape data deform processing unit that sets post-movement positions of graphic elements included in the shape data based on the machining target dimensions calculated by the machining target dimension calculation unit and the shape data so that a dimension between the graphic elements conforms to the corresponding machining target dimension; and
      a machining program creation unit that creates an NC machining program by using the shape data and the post-movement position of each graphic element set by the shape data deform processing unit,
   wherein:
      the dimensional tolerance data includes positional movement information about how to move the graphic elements,
      the shape data deform processing unit sets the post-movement positions of the graphic elements based on the positional movement information, and
      one of the graphic elements comprises at least two sub-elements, each corresponding to a respective surface and for which the post-movement positions are set based on an adjustment mode which is the positional movement information.

2. The program creation apparatus according to claim 1, wherein, when a graphic element is shared by a plurality of pieces of dimensional tolerance data, the shape data deform processing unit sets the post-movement position of the graphic element so that the shared graphic element conforms to each machining target dimension of the dimensional tolerance data sharing the graphic element.

3. The program creation apparatus according to claim 1, wherein
   one of the graphic elements is a graphic element group including a plurality of graphic elements, and
   the shape data deform processing unit sets a post-movement position of a predetermined coordinate associated with the graphic element group.

4. The program creation apparatus according to claim 1, wherein the adjust mode is selected from a group of adjustment modes comprising a first mode which instructs fixing one sub-element of the at least two sub-elements and moving with the other of the at least two sub-elements, automatic mode where a first sub-element of the at least two sub-elements is fixed while a second sub-element of the at least two sub-elements is moved and where the second sub-element is fixed while the first sub-element is moved.

5. The program creation apparatus according to claim 1, wherein the dimensional tolerance data comprises an identifier for a graphical element and an identifier for each of the at least two sub-elements, a dimension type, nominal dimension, at least two dimensional deviations, and the adjustment mode and wherein the adjustment mode comprises: a first mode which instructs fixing one sub-element of the at least two sub-elements and moving with the other of the at least two sub-elements, a second mode in which both sub-elements move from a fixed center, and a third mode where a first sub-element of the at least two sub-elements is fixed while a second sub-element of the at least two sub-elements is moved and where the second sub-element is fixed while the first sub-element is moved.

6. The program creation apparatus according to claim 1, wherein the machining target dimensions are calculated differently for the different adjustment modes.

7. A numerical control apparatus that performs machining control of a machining subject based on an NC machining program, the numerical control apparatus comprising the program creation apparatus that including:
   a memory which stores a plurality of units; and
   a processor which executes the stored plurality of units, the plurality of units comprising:
      a machining target dimension calculation unit that calculates machining target dimensions of the machining subject based on the shape data and the dimensional tolerance data;
      a shape data deform processing unit that sets post-movement positions of graphic elements included in the shape data based on the machining target dimensions calculated by the machining target dimension calculation unit and the shape data so that a dimension between the graphic elements conforms to the corresponding machining target dimension; and
      a machining program creation unit that creates an NC machining program by using the shape data and the post-movement position of each graphic element set by the shape data deform processing unit,
   wherein:
      the dimensional tolerance data includes positional movement information about how to move the graphic elements,
      the shape data deform processing unit sets the post-movement positions of the graphic elements based on the positional movement information, and
   wherein one of the graphic elements comprises at least two sub-elements, each corresponding to a respective surface and for which the post-movement positions are set based on an adjustment mode which is the positional movement information.

8. The numeric control apparatus according to claim 7, wherein the adjust mode is selected from a group of adjustment modes comprising a first mode which instructs fixing one sub-element of the at least two sub-elements and moving the other of the at least two sub-elements, automatic mode where a first sub-element of the at least two sub-elements is fixed while a second sub-element of the at least two sub-elements is moved and where the second sub-element is fixed while the first sub-element is moved.

9. The numeric control apparatus according to claim 7, wherein the dimensional tolerance data comprises an identifier for a graphical element and an identifier for each of the at least two sub-elements, a dimension type, nominal dimension, at least two dimensional deviations, and the adjustment mode and wherein the adjustment mode comprises: a first mode which instructs fixing one sub-element of the at least two sub-elements and moving with the other of the at least two sub-elements, a second mode in which both sub-elements move from a fixed center, and a third mode where a first sub-element of the at least two sub-elements is fixed while a second sub-element of the at least two sub-elements is moved and where the second sub-element is fixed while the first sub-element is moved.

10. The numeric control apparatus according to claim 7, wherein the machining target dimensions are calculated differently for the different adjustment modes.

11. A method of creating a program that creates, based on shape data of a machining subject and dimensional tolerance data of the shape data, an NC machining program reflecting the dimensional tolerance data on the shape data, the method of creating the program comprising:
calculating by a processor machining target dimensions of the machining subject based on the shape data and the dimensional tolerance data;
setting post-movement positions by the processor of graphic elements included in the shape data based on a calculated machining target dimension and the shape data so that a dimension between the graphic elements conforms to the corresponding machining target dimension; and
creating an NC machining program by using the shape data and set post-movement position of each graphic element,
wherein
the dimensional tolerance data includes positional movement information about how to move the graphic elements,
the post-movement positions of the graphic elements are set based on the positional movement information at the post-movement positions setting step, and
one of the graphic elements comprises at least two sub-elements, each corresponding to a respective surface and for which the post-movement positions are set based on an adjustment mode which is the positional movement information.

12. The method of creating a program according to claim 11, wherein the adjust mode is selected from a group of adjustment modes comprising a first mode which instructs fixing one sub-element of the at least two sub-elements and moving with the other of the at least two sub-elements, automatic mode where a first sub-element of the at least two sub-elements is fixed while a second sub-element of the at least two sub-elements is moved and where the second sub-element is fixed while the first sub-element is moved.

13. The method of creating a program according to claim 11, wherein the dimensional tolerance data comprises an identifier for a graphical element and an identifier for each of the at least two sub-elements, a dimension type, nominal dimension, at least two dimensional deviations, and the adjustment mode and wherein the adjustment mode comprises: a first mode which instructs fixing one sub-element of the at least two sub-elements and moving with the other of the at least two sub-elements, a second mode in which both sub-elements move from a fixed center, and a third mode where a first sub-element of the at least two sub-elements is fixed while a second sub-element of the at least two sub-elements is moved and where the second sub-element is fixed while the first sub-element is moved.

14. The method of creating a program according to claim 11, wherein the moving target dimensions are calculated differently for the different adjustment modes.

* * * * *